United States Patent
Dai et al.

(10) Patent No.: US 11,415,872 B2
(45) Date of Patent: Aug. 16, 2022

(54) WAVELENGTH CONVERSION DEVICE, LIGHT-EMITTING DEVICE AND PROJECTION DEVICE

(71) Applicant: APPOTRONICS CORPORATION LIMITED, Guangdong (CN)

(72) Inventors: Dayan Dai, Guangdong (CN); Hao Zhou, Guangdong (CN); Xia Song, Guangdong (CN); Yi Li, Guangdong (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 0 days.

(21) Appl. No.: 17/419,217

(22) PCT Filed: Dec. 23, 2019

(86) PCT No.: PCT/CN2019/127278
§ 371 (c)(1),
(2) Date: Jun. 28, 2021

(87) PCT Pub. No.: WO2020/135299
PCT Pub. Date: Jul. 2, 2020

(65) Prior Publication Data
US 2022/0121093 A1    Apr. 21, 2022

(30) Foreign Application Priority Data
Dec. 29, 2018 (CN) .......................... 201811645685.X

(51) Int. Cl.
*G03B 21/20* (2006.01)
*G02B 5/02* (2006.01)
*G02B 26/00* (2006.01)

(52) U.S. Cl.
CPC ......... *G03B 21/204* (2013.01); *G02B 5/0278* (2013.01); *G02B 26/007* (2013.01); *G03B 21/208* (2013.01); *G03B 21/2066* (2013.01)

(58) Field of Classification Search
CPC ................................................... G03B 21/204
See application file for complete search history.

(56) References Cited

U.S. PATENT DOCUMENTS

2017/0199451 A1    7/2017    Akiyama

FOREIGN PATENT DOCUMENTS

| CN | 102650409 A | 8/2012 |
|---|---|---|
| CN | 203489181 U | 3/2014 |

(Continued)

OTHER PUBLICATIONS

ISA China National Intellectual Property Administration, International Search Report Issued in Application No. PCT/CN2019/127278, dated Mar. 24, 2020, WIPO, 6 pages.

*Primary Examiner* — Vip Patel
(74) *Attorney, Agent, or Firm* — McCoy Russell LLP

(57) ABSTRACT

A wavelength conversion device and a light-emitting device and a projection device using the wavelength conversion device are provided. The wavelength conversion device includes a substrate capable of rotating around a rotating shaft, the substrate includes a first surface and a second surface opposite to each other, and an annular side surface, which is formed between the first surface and the second surface and is not perpendicular to the first surface. The first surface is provided with a wavelength conversion material layer, and the annular side surface includes a first area and a second area. The first area and the second area are used to reflect incident light beams.

20 Claims, 5 Drawing Sheets

(56) References Cited

FOREIGN PATENT DOCUMENTS

| | | | |
|---|---|---|---|
| CN | 104880819 | A | 9/2015 |
| CN | 108663879 | A | 10/2018 |

WAVELENGTH CONVERSION DEVICE, LIGHT-EMITTING DEVICE AND PROJECTION DEVICE

CROSS REFERENCE TO RELATED APPLICATIONS

The present application is a U.S. National Phase of International Application No. PCT/CN2019/127278 entitled "WAVELENGTH CONVERSION DEVICE, LIGHT-EMITTING DEVICE AND PROJECTION DEVICE," and filed on Dec. 23, 2019. International Application No. PCT/CN2019/127278 claims priority to Chinese Patent Application No. 201811645685.X filed on Dec. 29, 2018. The entire contents of each of the above-listed applications are hereby incorporated by reference for all purposes.

TECHNICAL FIELD

The present disclosure relates to the field of illumination and projection technologies, and in particular, to a wavelength conversion device, and a light-emitting device and a projection device that use the wavelength conversion device.

BACKGROUND AND SUMMARY

Currently, light sources of a projection device mainly include a pure laser light source and a laser fluorescence mixed light source. The pure laser light source typically adopts a red laser, a green laser, and a blue laser to emit laser light for illumination, resulting in a high cost. In addition, due to immaturity of technologies of the red laser light and the green laser light, there is a problem of low electro-optical conversion efficiency. The laser light-fluorescence mixed light source typically adopts the blue laser light as the primary laser light to excite different phosphors to generate fluorescence of different colors, which greatly reduces costs compared with the pure laser light source.

In a method for generating fluorescence in the prior art, different phosphors are coated on a color wheel, and a motor drives the color wheel to generate sequential fluorescence. However, an optical spectrum of the generated fluorescence is relatively broad, and a shading film is required for filtering. Filtering of the fluorescence is usually implemented by adding a corresponding shading film at an inner side or an outer side of the color wheel. However, the red light efficiency is low, and the brightness of a light source cannot be maximized.

To increase a proportion of the red light efficiency in a white balance color gamut to achieve a broader color gamut and a higher light efficiency, a common solution is to add a red laser light source and use another color wheel for light scattering and exiting, so that red laser light generated by the red laser light source and the red fluorescence are mixed to enter an optical machine. However, this increases space occupied by an overall structure of the light source, and is contrary to an actual requirement for reducing occupied space.

An objective of the present disclosure is to provide a wavelength conversion device that can increase brightness of a light source and reduce its occupied space, and a light-emitting device and a projection device that use the wavelength conversion device.

To achieve the foregoing objective, the present disclosure provides a wavelength conversion device, and the wavelength conversion device includes a substrate capable of rotating around a rotation axis. The substrate includes a first surface and a second surface that face away from each other, and a side surface connecting the first surface and the second surface. The side surface is not perpendicular to the first surface. A wavelength conversion material layer is provided on the first surface, and the side surface includes a first region and a second region that are configured to reflect an incident light beam.

The present disclosure further provides a projection device, including the foregoing light-emitting device.

According to the wavelength conversion device and the light-emitting device provided in the present disclosure, the first laser light emitted by the first light source and the second laser light emitted by the second light source are reflected and scattered by the first region and the second region of the side surface of the substrate, respectively. This not only can overcome an existing disadvantage that the brightness of a light source cannot be maximized, but also can make the structure more compact to facilitate reducing of the occupied space.

DESCRIPTION OF REFERENCE NUMERALS OF MAIN COMPONENTS

Figure 1:
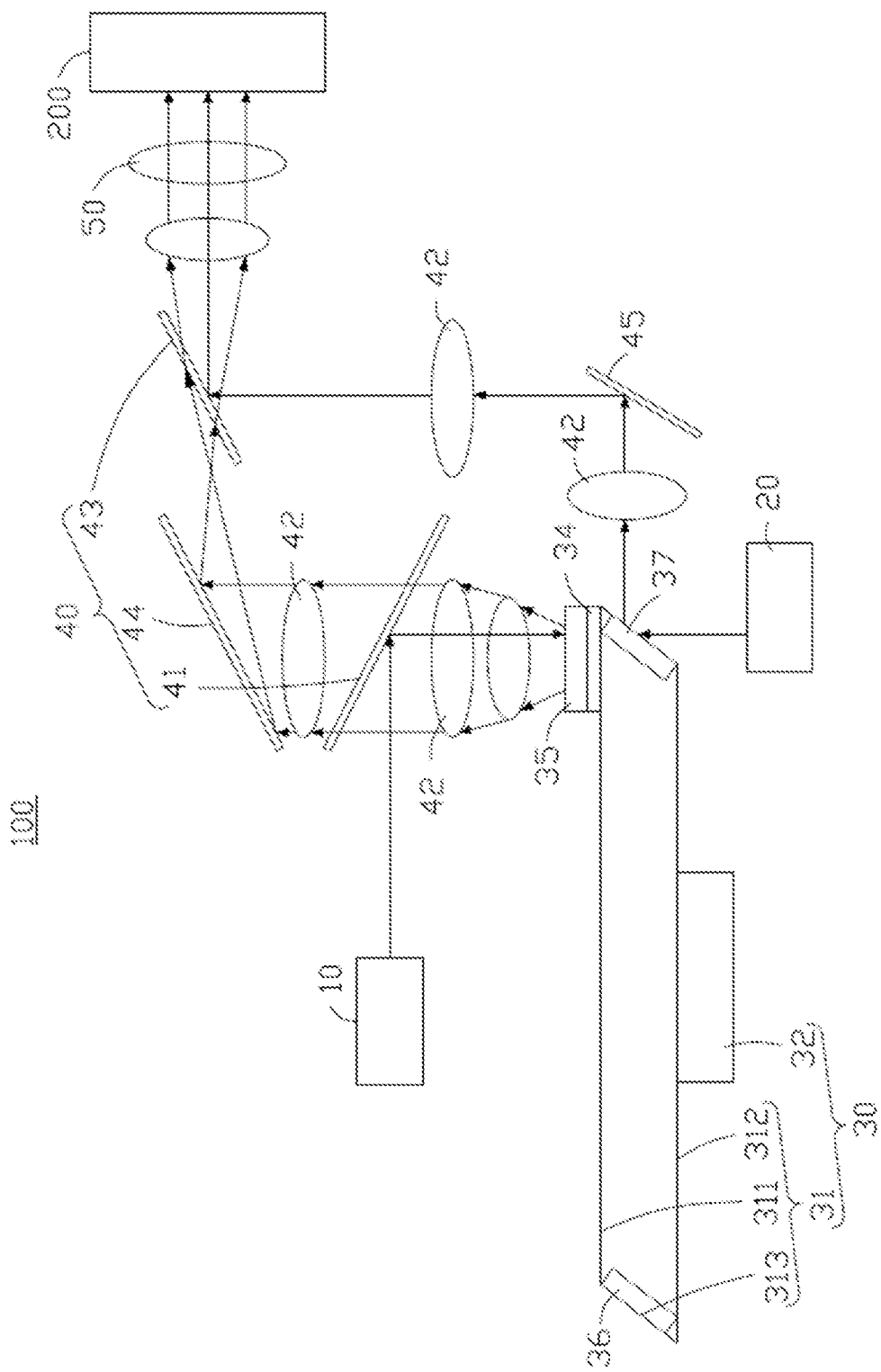
FIG. 1 is a schematic diagram of a light-emitting device according to an embodiment of the present disclosure.

Light-emitting device 100
First light source 10
Second light source 20
Wavelength conversion device 30
Substrate 31
First surface 311
Second surface 312
Side surface 313
First region 3131
Second region 3132
Groove 3133
Driving member 32
Rotation axis 33
Reflective layer 34
Wavelength conversion material layer 35
First wavelength conversion section 351
Second wavelength conversion section 352
Third wavelength conversion section 353
First light diffuser 36
First transmission diffusion film 361
First reflective film 362
Second light diffuser 37
Second transmission diffusion film 371
Second reflective film 372
Light guiding assembly 40
Dichroic sheet 41
Focusing lens 42
Regional film 43
First reflector 44
Second reflector 45
Collimating lens assembly 50

DETAILED DESCRIPTION

The present disclosure is further described in the following specific implementation with reference to the accompanying drawings.

Referring to FIG. 1, FIG. 1 is a schematic diagram of a light-emitting device 100 according to an embodiment of the present disclosure. The light-emitting device 100 includes a first light source 10, a second light source 20 and a wavelength conversion device 30.

Specifically, the first light source 10 is configured to emit first laser light. The first laser light can be used as exciting light to excite a wavelength conversion material to generate fluorescence. The second light source 20 is configured to emit second laser light. In this embodiment, the first laser light emitted by the first light source 10 is blue laser light, and the second laser light emitted by the second light source 20 is red laser light. In other embodiments, the second laser light emitted by the second light source 20 can be green laser light, blue laser light or yellow laser light.

Figure 2:
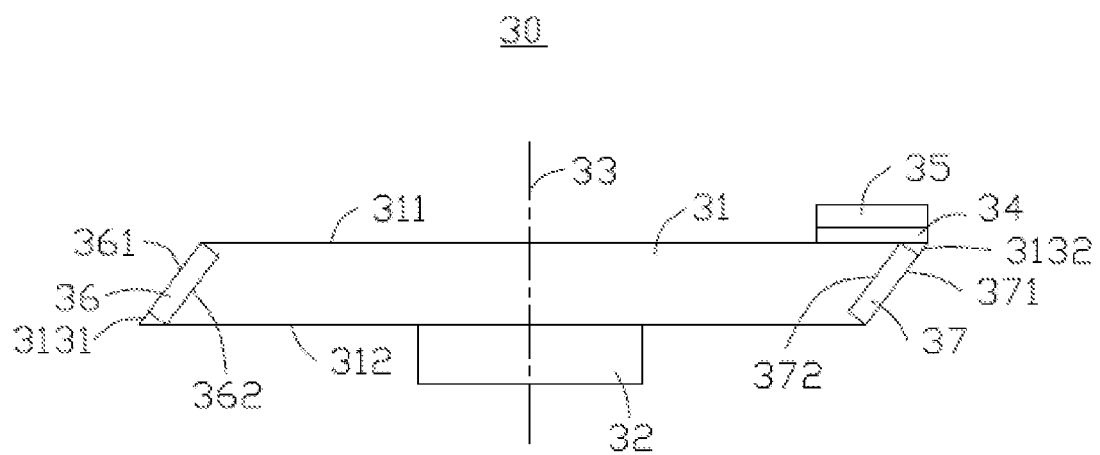
FIG. 2 is a schematic diagram of a wavelength conversion device in the light-emitting device shown in FIG. 1.

Also referring to FIG. 2, the wavelength conversion device 30 includes a substrate 31 and a driving member 32, and the driving member 32 can drive the substrate 31 to rotate, that is, the driving member 32 drives the substrate 31 to rotate around a rotation axis 33 passing through the substrate 31. In this embodiment, the driving member 32 is an electric motor, and the rotation axis 33 and a rotating shaft of the electric motor are located on a same straight line. It should be noted that, in other embodiments, the substrate 31 can move or not move in other manners.

Specifically, the substrate 31 includes a first surface 311, a second surface 312 and a side surface 313. The first surface 311 and the second surface 312 are respectively located on two opposite sides of the substrate 31. The side surface 313 is enclosed between the first surface 311 and the second surface 312, and the side surface 313 is not parallel to the first surface 311. In this embodiment, the first surface 311 and the second surface 312 are parallel to and spaced apart from each other, and are each perpendicular to the rotation axis 33.

Further, a reflective layer 34 and a wavelength conversion material layer 35 that are sequentially laminated are provided on the first surface 311 of the substrate 31, that is, the reflective layer 34 is located between the wavelength conversion material layer 35 and the first surface 311. A wavelength conversion material is provided in the wavelength conversion material layer 35, so that a wavelength conversion is performed on the first laser light incident to the wavelength conversion material layer 35 to generate fluorescence. In addition, a color of the fluorescence is affected by a type of the wavelength conversion material of the wavelength conversion material layer 35.

Figure 3:
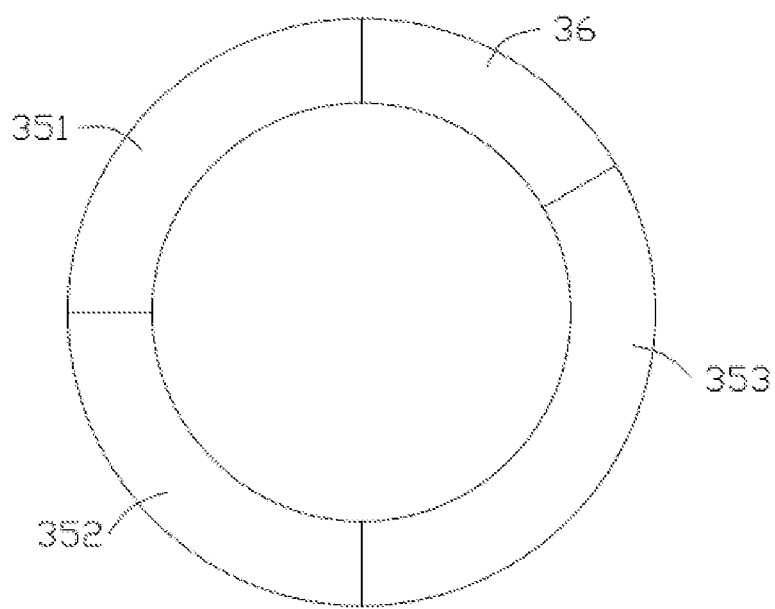
FIG. 3 is a top view of the wavelength conversion device shown in FIG. 2.

Referring to FIG. 3, the wavelength conversion material layer 35 includes a first wavelength conversion section 351, a second wavelength conversion section 352 and a third wavelength conversion section 353 that are sequentially and adjacently arranged. The first wavelength conversion section 351, the second wavelength conversion section 352 and the third wavelength conversion section 353 are respectively provided with different wavelength conversion materials to be excited to generate fluorescence of different colors. In this embodiment, the first wavelength conversion section 351 is excited to generate green fluorescence when the blue laser light emitted by the first light source 10 is incident to the first wavelength conversion section 351, the second wavelength conversion section 352 is excited to generate red fluorescence when the blue laser light emitted by the first light source 10 is incident to the second wavelength conversion section 352, and the third wavelength conversion section 353 is excited to generate yellow fluorescence when the blue laser light emitted by the first light source 10 is incident to the third wavelength conversion section 353.

It should be noted that, the reflective layer 34 can reflect the first laser light incident to the wavelength conversion material layer 35, to improve conversion efficiency of the first laser light and reduce light loss.

Referring to FIG. 1 and FIG. 2, the side surface 313 includes a first region 3131 and a second region 3132 that are configured to reflect an incident light beam. One side of the first region 3131 is adjacently connected to the second surface 312, and the other side thereof faces towards the first surface 311 and is inclined towards the rotation axis 33. One side of the second region 3132 is adjacently connected to the second surface 312, and the other side thereof is faces towards the first surface 311 and is inclined towards the rotation axis 33.

A projection of the first region 3131 a plane perpendicular to the rotation axis 33 and a projection of the wavelength conversion material layer 35 on the plane perpendicular to the rotation axis 33 are adjacently connected to each other end to end to form a circular ring, and a center of the circular ring is located on the rotation axis 33. A projection of the second region 3132 on the plane perpendicular to the rotation axis 33 and a projection of the wavelength conversion material layer 35 on the plane perpendicular to the rotation axis 33 overlap. It should be noted that, "overlap" can be a complete overlap, or can be a partial overlap.

In this embodiment, the first region 3131 and the second region 3132 are parallel to each other, and a projection of the first region 3131 on the plane perpendicular to the rotation axis 33 and a projection of the second region 3132 on the plane perpendicular to the rotation axis 33 are each of an annular sector shape. Specifically, the annular sector shape of the projection of the first region 3131 and the annular sector shape of the projection of the second region 3132 have a same circle center, and are arranged symmetrically with respect to the circle center. In other embodiments, projections of the first region 3131 and the second region 3132 on the plane perpendicular to the rotation axis 33 are not limited to being arranged symmetrically with respect to the center. Preferably, an angle between the first region 3131 and the rotation axis 33 is between greater than 40° and smaller than 90°, which facilitates an arrangement of an optical path.

In this embodiment, the projection of the first region 3131 on the plane perpendicular to the rotation axis 33 and the projection of the second wavelength conversion section 352 on the plane perpendicular to the rotation axis 33 are diagonally arranged with the rotation axis as a center, and the projection of the second region 3132 on the plane perpendicular to the rotation axis 33 and the projection of the second wavelength conversion section 352 on the plane perpendicular to the rotation axis 33 completely overlap.

Referring to FIG. 2, a first light diffuser 36 is provided in the first region 3131, and a second light diffuser 37 is provided in the second region 3132. The first light diffuser 36 is in a shape of a curved sheet and includes a first transmission diffusion film 361 and a first reflective film 362. The first transmission diffusion film 361 and the first reflective film 362 are located on two opposite surfaces of the first light diffuser 36, respectively, and the first transmission diffusion film 361 is located on a side of the first light diffuser 36 away from the rotation axis 33. The second light diffuser 37 is in a shape of a curved sheet and includes a second transmission diffusion film 371 and a second reflective film 372. The second transmission diffusion film 371 and the second reflective film 372 are located on two opposite surfaces of the second light diffuser 37, respectively, and the second transmission diffusion film 371 is located on a side of the second light diffuser 37 away from the rotation axis 33. In other embodiments, a coating method can be directly used to enable the first region 3131 and the second region 3132 to reflect the incident light beam.

Figure 4:
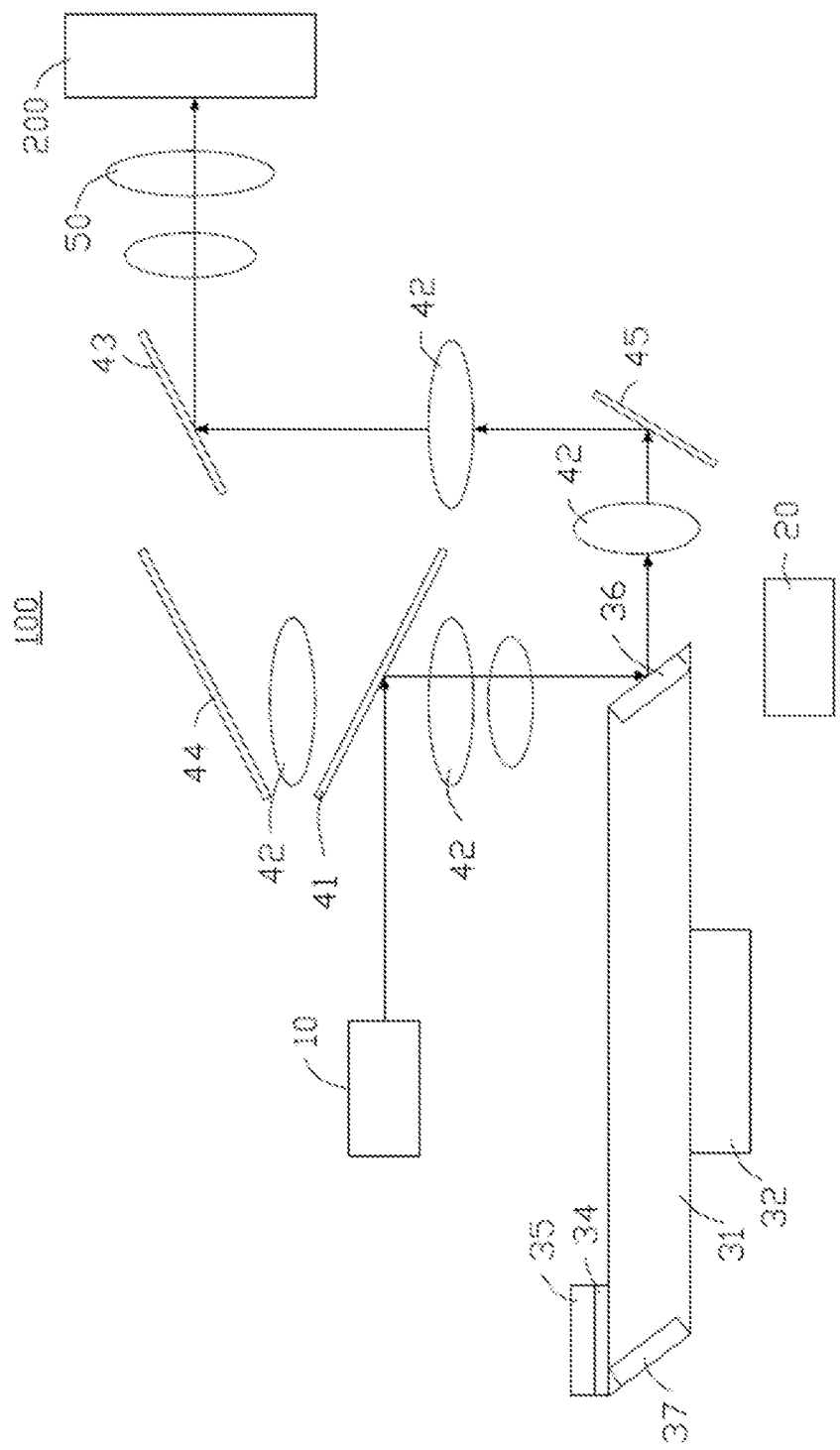
FIG. 4 is a schematic diagram of the light-emitting device shown in FIG. 1 in another state.

Referring to FIG. 1 and FIG. 4, an operation principle of the light-emitting device 100 provided in this embodiment is as follows.

The substrate 31 is driven by the driving member 32 to rotate around the rotation axis 33, and the blue laser light emitted by the first light source 10 is incident to the wavelength conversion material layer 35 and the first light diffuser 36 in time sequence. When the blue laser light emitted by the first light source 10 is incident to the first light diffuser 36 (referring to FIG. 4), the blue laser light is reflected by the first reflective film 362 after being transmitted and diffused by the first transmission diffusion film 361, and then emitted from the wavelength conversion device 30 after being transmitted and diffused by the first transmission diffusion film 361 again. In this case, the light emitted by the wavelength conversion device 30 is diffused blue light.

When the blue laser light emitted by the first light source 10 is incident to the wavelength conversion material layer 35 (referring to FIG. 1), the blue laser light excites the wavelength conversion material in the wavelength conversion material layer 35 to be converted into fluorescence. In addition, when the blue laser light is incident to the second wavelength conversion section 352, the red laser light emitted by the second light source 20 is incident to the second light diffuser 37. When the red laser light emitted by the second light source 20 is incident to the second light diffuser 37, the red laser light is reflected by the second reflective film 372 after being transmitted and diffused by the second transmission diffusion film 371, and then emitted from the wavelength conversion device 30 after being transmitted and diffused by the second transmission diffusion film 371 again. In this case, the light emitted by the wavelength conversion device 30 is red light, that is, mixed light of red fluorescence and the red laser light.

In this embodiment, the first light source 10 is located at a side of the first surface 311 of the substrate 31, and the second light source 20 is located at a side of the second surface 312 of the substrate 31. In other embodiments, the first light source 10 is not limited to be arranged at the side of the first surface 311 of the substrate 31, and the second light source 20 is not limited to be arranged at the side of the second surface 312 of the substrate 31. Another optical element such as a reflective surface can be used to cause the first laser light emitted by the first light source 10 to be incident to the wavelength conversion material layer 35 and the first light diffuser 36 in time sequence, and to cause the second laser light emitted by the second light source 20 to be incident to the second light diffuser 37. It can be understood that, arranging the first light source 10 at the side of the first surface 311 of the substrate 31 and arranging the second light source 20 at the side of the second surface of the substrate 31 can reduce an optical distance, which makes the structure more compact.

Further, the light-emitting device 100 further includes a light guiding assembly 40. The light guiding assembly 40 includes a dichroic sheet 41, a plurality of focusing lenses 42, a regional film 43, a first mirror 44 and a second mirror 45, so that light of various colors emitted by the wavelength conversion device 30 passes through the light guiding assembly 40 and then enters other subsequent optical devices (such as, a spatial light modulator 200) along a same path.

Specifically, the dichroic sheet 41 can reflect the blue light and transmit light of other colors. The blue laser light emitted by the first light source 10 is incident to the wavelength conversion material layer 35 or the first light diffuser 36 after being reflected by the dichroic sheet 41. Fluorescence emitted by the wavelength conversion material layer 35 passes through the dichroic sheet 41 and is transmitted by the regional film 43 after being reflected by the first mirror 44. Light beams emitted from the first light diffuser 36 and the second light diffuser 37 are reflected by the regional film 43 after being reflected by the second mirror 45. Therefore, the light of various colors emitted by the wavelength conversion device 30 is emitted along a same path after passing through the regional film 43.

The plurality of focusing lenses 42 are arranged on an optical path between the dichroic sheet 41 and the substrate 31, an optical path between the dichroic sheet 41 and the first mirror 44, an optical path between the substrate 31 and the second mirror 45, and an optical path between the second mirror 45 and the regional film 43, respectively, to achieve a light-focusing effect.

Further, the light-emitting device 100 further includes a collimating lens assembly 50. The light emitted from the regional film 43 can be collimated after passing through the collimating lens assembly 50.

Figure 5:
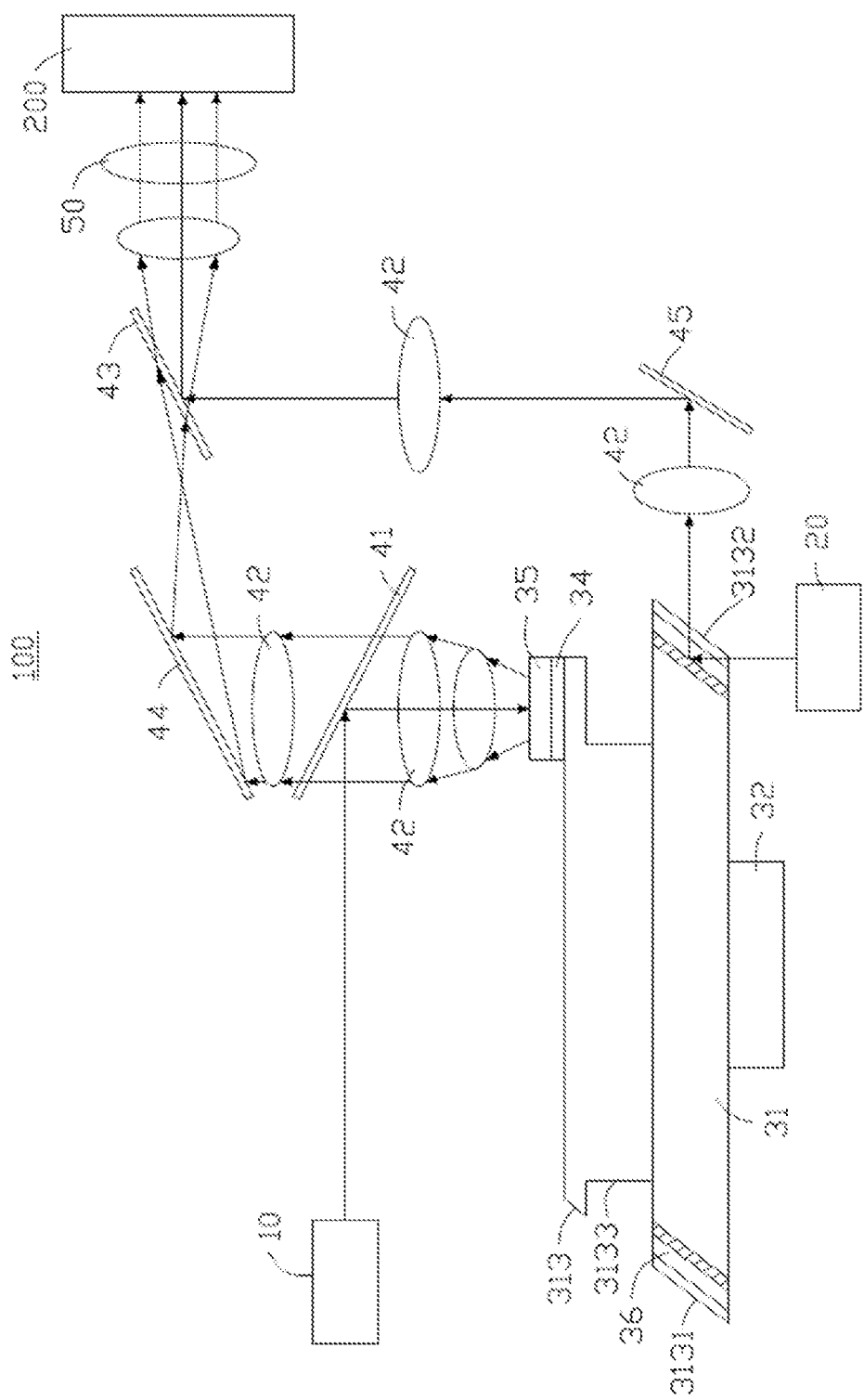
FIG. 5 is a schematic diagram of a light-emitting device according to another embodiment of the present disclosure.

FIG. 5 is a schematic diagram of a light-emitting device 100 according to another embodiment of the present disclosure. The structure of the light-emitting device 100 shown in FIG. 5 is basically the same as that of the light-emitting device 100 shown in FIG. 1. Differences lie in that the side surface 313 of the light-emitting device 100 shown in FIG. 5 is provided with a groove 3133 recessed toward the rotation axis 33, and the first region 3131 and the second region 3132 are both formed between the second surface 312 and the groove 3133.

It should be noted that, a lot of heat is generated in the process in which the first laser light emitted by the first light source 10 is incident to the wavelength conversion material layer 35 and converted into fluorescence, and the arrangement of the groove 3133 facilitates the heat dissipation of the wavelength conversion device 30. In addition, the groove 3133 is of a ring shape, so that the substrate 31 forms a double-layer structure. Practice has shown that double-layer dynamic balance adjustment of the substrate 31 has a better vibration effect compared to a vibration effect achieved by a single-layer dynamic balance adjustment.

The light-emitting device 100 provided in any one of the foregoing embodiments can be applied to projection and display systems, such as a liquid crystal display (LCD) or a digital light processor (DLP) projector; or can be applied to an illumination system, such as automotive illuminating lights or stage lights; or can be applied to the field of 3D display technologies.

Further, the present disclosure further provides a projection device (not shown). The projection device includes the light-emitting device 100 according to any one of the foregoing embodiments.

The foregoing descriptions are merely implementations of the present disclosure, and are not intended to limit the patent scope of the present disclosure. Any equivalent structural modification or any equivalent procedure modification made with reference to the content of the specification and the accompanying drawings of the present disclosure, or directly or indirect application to other related technical fields shall fall within the patent protection scope of the present disclosure.

The invention claimed is:

1. A wavelength conversion device, comprising a substrate capable of rotating around a rotation axis, wherein the substrate comprises a first surface and a second surface that face away from each other, and a side surface connecting the first surface and the second surface, wherein the side surface is not perpendicular to the first surface, and a wavelength conversion material layer is provided on the first surface, wherein the side surface comprises a first region and a second region that are configured to reflect an incident light beam.

2. The wavelength conversion device according to claim 1, wherein a first light diffuser is provided in the first region, and a second light diffuser is provided in the second region, wherein the light diffuser and the second light diffuser are parallel to each other and configured to reflect the incident light beam.

3. The wavelength conversion device according to claim 2, wherein the first light diffuser comprises a first transmission diffusion film and a first reflective film, and the first transmission diffusion film is located on a side of the first region facing away from the rotation axis; and the second light diffuser comprises a second transmission diffusion film and a second reflective film, and the second transmission diffusion film is located on a side of the second region facing away from the rotation axis.

4. The wavelength conversion device according to claim 1, wherein a projection of the first region on a plane perpendicular to the rotation axis and a projection of the wavelength conversion material layer on the plane perpendicular to the rotation axis are connected end to end to form a circular ring; and a projection of the second region on the plane perpendicular to the rotation axis and the projection of the wavelength conversion material layer on the plane perpendicular to the rotation axis overlap.

5. The wavelength conversion device according to claim 1, wherein the first region and the second region are parallel to each other, both of a projection of the first region on a plane perpendicular to the rotation axis and a projection of the second region on the plane perpendicular to the rotation axis are of an annular sector shape, and the annular sector shape of the projection of the first region and the annular sector shape of the projection of the second region have a same circle center and are arranged symmetrically with respect to the circle center.

6. The wavelength conversion device according to claim 5, wherein an angle between the first region and the rotation axis is greater than 40° and smaller than 90°.

7. The wavelength conversion device according to claim 1, wherein the side surface is provided with a groove recessed toward the rotation axis, and the first region and the second region are both located between the second surface and the groove.

8. The wavelength conversion device according to claim 1, further comprising a reflective layer located between the first surface and the wavelength conversion material layer.

9. The wavelength conversion device according to claim 1, wherein the wavelength conversion material layer comprises a first wavelength conversion section, a second wavelength conversion section and a third wavelength conversion section that are sequentially and adjacently arranged and are provided with different wavelength conversion materials, respectively.

10. The wavelength conversion device according to claim 9, wherein a projection of the first region on a plane perpendicular to the rotation axis and a projection of the second wavelength conversion section on the plane perpendicular to the rotation axis are diagonally arranged with respect to the rotation axis as a center; and a projection of the second region on the plane perpendicular to the rotation axis and the projection of the second wavelength conversion section on the plane perpendicular to the rotation axis completely overlap.

11. A light-emitting device, comprising a first light source, a second light source and a wavelength conversion device, wherein the wavelength conversion device comprises a substrate capable of rotating around a rotation axis, wherein the substrate comprises a first surface and a second surface that face away from each other, and a side surface connecting the first surface and the second surface, wherein the side surface is not perpendicular to the first surface, and a wavelength conversion material layer is provided on the first surface, wherein the side surface comprises a first region and a second region that are configured to reflect an incident light beam;

wherein the first light source is configured to emit first laser light, the first laser light is incident to the first region and the wavelength conversion material layer in time sequence, and the first laser light incident to the wavelength conversion material layer is capable of being converted into fluorescence; and wherein the second light source is configured to emit second laser light, and the second laser light is mixed with fluorescence of a same color after being reflected by the second region and is emitted.

12. The light-emitting device according to claim 11, wherein the first light source is located on a side of the first surface, the second light source is formed on a side of the second surface, wherein the first laser light emitted by the first light source is blue laser light, and the second laser light emitted by the second light source is one of red laser light, green laser light, blue laser light and yellow laser light.

13. The light-emitting device according to claim 11, further comprising a light guiding assembly, wherein the light guiding assembly comprises a dichroic sheet, a mirror, a focusing lens and a regional film, and is configured to guide light of various colors emitted by the wavelength conversion device to be emitted along a same path.

14. A projection device, comprising a light-emitting device, wherein the light-emitting device comprises a first light source, a second light source and a wavelength conversion device, wherein the wavelength conversion device comprises a substrate capable of rotating around a rotation axis, wherein the substrate comprises a first surface and a second surface that face away from each other, and a side surface connecting the first surface and the second surface, wherein the side surface is not perpendicular to the first surface, and a wavelength conversion material layer is provided on the first surface, wherein the side surface comprises a first region and a second region that are configured to reflect an incident light beam;

wherein the first light source is configured to emit first laser light, the first laser light is incident to the first region and the wavelength conversion material layer in time sequence, and the first laser light incident to the wavelength conversion material layer is capable of being converted into fluorescence; and wherein the second light source is configured to emit second laser light, and the second laser light is mixed with fluorescence of a same color after being reflected by the second region and is emitted.

15. The light-emitting device according to claim 11, wherein a first light diffuser is provided in the first region, and a second light diffuser is provided in the second region, wherein the first light diffuser and the second light diffuser are parallel to each other and configured to reflect the incident light beam.

16. The light-emitting device according to claim 15, wherein the first light diffuser comprises a first transmission diffusion film and a first reflective film, and the first transmission diffusion film is located on a side of the first region facing away from the rotation axis; and the second light diffuser comprises a second transmission diffusion film and a second reflective film, and the second transmission diffusion film is located on a side of the second region facing away from the rotation axis.

17. The light-emitting device according to claim 11, wherein the side surface is provided with a groove recessed toward the rotation axis, and the first region and the second region are both located between the second surface and the groove.

18. The light-emitting device according to claim 11, wherein the wavelength conversion material layer comprises a first wavelength conversion section, a second wavelength conversion section and a third wavelength conversion section that are sequentially and adjacently arranged, wherein the first wavelength conversion section, the second wavelength conversion section and the third wavelength conversion section are respectively provided with different wavelength conversion materials to be excited to generate fluorescence of different colors; and when the first laser light is incident to the second wavelength conversion section, the second laser light emitted by the second light source is red laser light, and mixed light of red fluorescence and the red laser light is emitted.

19. The projection device according to claim 14, wherein a first light diffuser is provided in the first region, and a second light diffuser is provided in the second region, wherein the first light diffuser and the second light diffuser are parallel to each other and configured to reflect the incident light beam.

20. The projection device according to claim 19, wherein the first light diffuser comprises a first transmission diffusion film and a first reflective film, and the first transmission diffusion film is located on a side of the first region facing away from the rotation axis; and the second light diffuser comprises a second transmission diffusion film and a second reflective film, and the second transmission diffusion film is located on a side of the second region facing away from the rotation axis.

* * * * *